United States Patent
Yin et al.

(10) Patent No.: US 12,500,988 B2
(45) Date of Patent: Dec. 16, 2025

(54) SYSTEM AND METHOD FOR ENHANCING VISUALIZATION OF AN EYE IMAGE

(71) Applicant: ALCON INC., Fribourg (CH)

(72) Inventors: Lu Yin, Keller, TX (US); Ashok Burton Tripathi, Santa Barbara, CA (US); Ramesh Sarangapani, Fort Worth, TX (US)

(73) Assignee: Alcon, Inc., Fribourg (CH)

( * ) Notice: Subject to any disclaimer, the term of this patent is extended or adjusted under 35 U.S.C. 154(b) by 370 days.

(21) Appl. No.: 17/507,082

(22) Filed: Oct. 21, 2021

(65) Prior Publication Data

US 2022/0198653 A1    Jun. 23, 2022

Related U.S. Application Data

(60) Provisional application No. 63/127,069, filed on Dec. 17, 2020.

(51) Int. Cl.
*G06T 7/00* (2017.01)
*A61B 3/14* (2006.01)
(Continued)

(52) U.S. Cl.
CPC .............. *H04N 1/622* (2013.01); *A61B 3/14* (2013.01); *G06T 7/0012* (2013.01); *G06T 2207/30041* (2013.01)

(58) Field of Classification Search
CPC ............ G06T 7/0012; G06T 5/00; G06T 2207/30041; A61B 3/14; H04N 1/622
See application file for complete search history.

(56) References Cited

U.S. PATENT DOCUMENTS

2004/0216750 A1* 11/2004 Snyder ............... A61F 9/0008
                                                          128/898
2005/0083542 A1*  4/2005 Jacob ................. H04N 1/6022
                                                          358/529
(Continued)

FOREIGN PATENT DOCUMENTS

EP    1372109 A2   12/2003
EP    2924971 A1    9/2015
(Continued)

OTHER PUBLICATIONS

PCT international search report (Year: 2020).*
Konica Minolta, Features of the CIE 2000 Color Difference Formula, Nov. 2020 (Year: 2020).*

*Primary Examiner* — Stephen S Hong
*Assistant Examiner* — Carl E Barnes, Jr.
(74) *Attorney, Agent, or Firm* — Nayyer J. Siddiqi; Quinn IP Law

(57) ABSTRACT

A system and method for visually enhancing an original image of an eye includes a visualization module. A controller is configured to convert an output of the visualization module to a first pixel cloud in a first color space and map the first pixel cloud to a second pixel cloud in a second color space. The method includes identifying at least one selected zone in the second color space. The controller is configured to move the selected zone from an original location to a modified location in the second color space. The second pixel cloud is updated to obtain a modified second pixel cloud, which is transformed into a third pixel cloud in the first color space. An enhanced image is formed based in part on the modified second pixel cloud and provides selective visual enhancement in the selected zone without affecting contrast in a remainder of the original image.

18 Claims, 5 Drawing Sheets

(51) Int. Cl.
*G06T 5/00* (2024.01)
*H04N 1/62* (2006.01)

(56) References Cited

U.S. PATENT DOCUMENTS

| | | | | |
|---|---|---|---|---|
| 2005/0219585 A1* | 10/2005 | Suzuki | ................ | H04N 1/6058 |
| | | | | 358/1.9 |
| 2006/0007458 A1* | 1/2006 | Hardy | ................... | G06T 11/001 |
| | | | | 358/1.9 |
| 2013/0315482 A1 | 11/2013 | Iwamoto | | |
| 2019/0192115 A1* | 6/2019 | Ford | ........................ | A61B 3/14 |
| 2022/0020118 A1* | 1/2022 | Hallen | ................... | G16H 20/40 |
| 2022/0398701 A1* | 12/2022 | Tanabe | ...................... | G06T 5/73 |
| 2023/0377786 A1* | 11/2023 | Kou | ..................... | H05K 9/0083 |

FOREIGN PATENT DOCUMENTS

| | | | | |
|---|---|---|---|---|
| EP | 2924971 A2 * | 9/2015 | ........... | G06T 7/0012 |
| JP | 2015192840 A | 11/2015 | | |
| JP | 2017079904 A | 5/2017 | | |

\* cited by examiner

SYSTEM AND METHOD FOR ENHANCING VISUALIZATION OF AN EYE IMAGE

PRIORITY CLAIM

This application claims priority to, and benefit of, U.S. Provisional Patent Application Ser. No. 63/127,069 (filed Dec. 17, 2020), the contents of which is hereby incorporated by reference in its entirety.

INTRODUCTION

The present disclosure relates generally to a system and method for guiding a surgeon in an ophthalmic procedure. More specifically, the disclosure relates to enhancing visualization of an image of an eye. Various parts of the eye, such as the retina, the macula, the lens and the vitreous body, may be subject to a variety of diseases and conditions leading to vision loss and may require the attention of a surgeon. Surgery is a challenging field, requiring both knowledge and skill to perform. This challenge is greater when the procedure involves structures of the body that are small, delicate and difficult to visualize with the naked eye. The eye is an example of such a structure. To assist a surgical team, prior to and during ophthalmic surgery, various imaging modalities may be employed to obtain images of the eye in real-time. However, in some clinical scenarios, the images obtained may not provide sufficient visibility or contrast. Additionally, increasing contrast in one portion of an image may result in decreased contrast in other parts of the image.

SUMMARY

Disclosed herein is a system for visually enhancing an original image of an eye. The system includes a visualization module configured to obtain the original image, the visualization module including a photosensor. A controller is in communication with the visualization module. The controller has a processor and tangible, non-transitory memory on which instructions are recorded. Execution of the instructions causes the controller to convert an output of the visualization module to a first pixel cloud in a first color space.

The controller is configured to map the first pixel cloud to a second pixel cloud in a second color space. The method includes identifying at least one selected zone ("at least one" omitted henceforth) in the second pixel cloud. The selected zone is the portion of the eye for which visual enhancement is desired. The controller is configured to move the selected zone from an original location to a modified location in the second color space. The second pixel cloud is updated in the second color space to obtain a modified second pixel cloud. The modified second pixel cloud is then transformed into a third pixel cloud in the first color space. An enhanced image is formed based in part on the modified second pixel cloud, the enhanced image providing selective visual enhancement in the at least one selected zone.

The first color space may be an RGB color space. The second color space is a CIELAB color space (Lab) having a first axis (L) representing a lightness factor, a second axis (a) representing a green to red continuum and a third axis (b) representing a blue to yellow continuum. The controller may be adapted to continuously update the original image in real-time via a data structure having a plurality of data repositories. Each of the plurality of data repositories respectively has a first list representing an original pixel color in the first color space and a second list representing an enhanced pixel color in the first color space.

In one example, the photosensor includes a plurality of sensors and converting the output from the visualization module is based in part on a respective spectral sensitivity of the plurality of sensors in the photosensor. The second color space may include a plurality of axes. The modified location may be a translation of the original location along at least one of plurality of axes in the second color space. The modified location may be a mirror image of the original location along a respective axis in the second color space. In another example, the original image exhibits a first color cast induced by an input illuminant and the controller is adapted to apply a chromatic adaptation transformation to convert the first color cast to a second color cast such that the enhanced image exhibits the second color cast.

In some embodiments, the selected zone corresponds to one or more blood vessels in the eye, the original image of the eye being taken during an air-fluid exchange. The enhanced image of the eye is adapted to compensate for loss of contrast in the one or more blood vessels during the air-fluid exchange. In some embodiments, the selected zone corresponds to a region of the eye that is relatively pale, the enhanced image of the eye providing a virtual dye by digitally staining the region with a predetermined color. In some embodiments, the selected zone corresponds to particles that are suspended in the eye and become relatively pale over time, the enhanced image of the eye providing a virtual dye by digitally staining the particles with a predetermined color.

The eye may be exposed to a dye for selective uptake, the at least one selected zone corresponding to a stain of the dye absorbed by a region of the eye. The enhanced image of the eye provides color intensification in the selected zone. The dye is partially absorbed at a first time and fully absorbed at a second time, the second time being greater than the first time. The original image of the eye may be enhanced at the first time to minimize exposure of the dye to the eye. The original image may be obtained during peeling of an epiretinal membrane in the eye. The dye may be indocyanine green. The dye is fully absorbed at a second time and begins fading at a third time, the third time being greater than the second time. The original image of the eye may be enhanced at the third time to extend a useful duration of the dye. In some embodiment, the original image is obtained during cataract surgery and the dye is absorbed by a capsular membrane of the eye, the enhanced image providing enhanced visualization of the capsular membrane.

A method is disclosed for visually enhancing an original image of an eye in a system having a visualization module and a controller with a processor and tangible, non-transitory memory. The method includes converting an output of the visualization module to a first pixel cloud in a first color space, via the controller, and mapping the first pixel cloud to a second pixel cloud in a second color space. The method includes identifying at least one selected zone in the second pixel cloud, via the controller, the selected zone being a portion of the eye for which visual enhancement is desired. The selected zone is moved from an original location to a modified location in the second color space, via the controller. The method includes updating the second pixel cloud in the second color space to obtain a modified second pixel cloud, via the controller, and transforming the modified second pixel cloud in the second color space to a third pixel cloud in the first color space. An enhanced image of the eye is formed based in part on the third pixel cloud, the enhanced image providing selective visual enhancement in the at least one selected zone.

The above features and advantages and other features and advantages of the present disclosure are readily apparent from the following detailed description of the best modes for carrying out the disclosure when taken in connection with the accompanying drawings.

DETAILED DESCRIPTION

Figure 1:
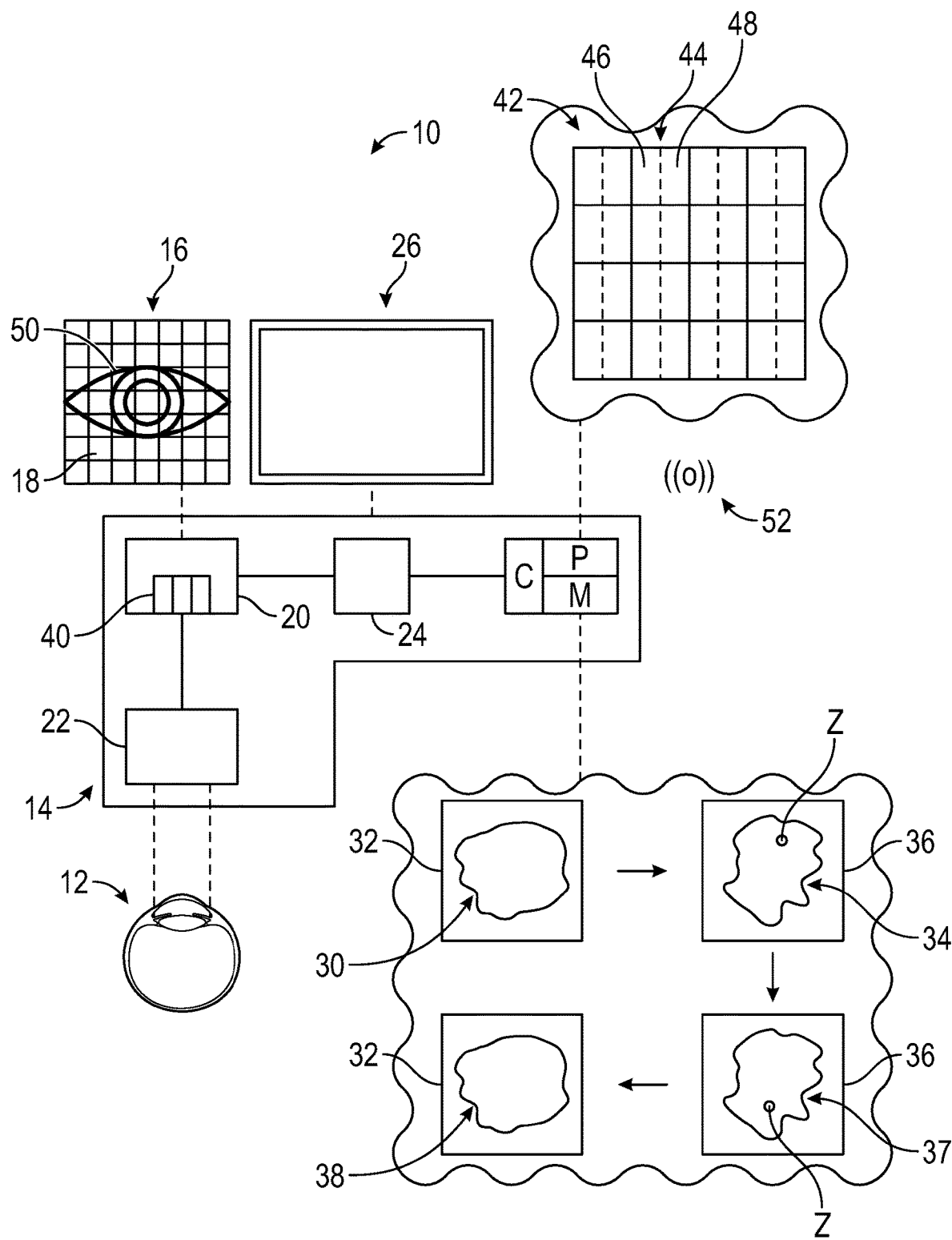
FIG. 1 is a schematic fragmentary perspective view of a system for enhancing visualization of an original image of an eye, the system having a visualization module and a controller.

Referring to the drawings, wherein like reference numbers refer to like components, FIG. 1 schematically illustrates a system 10 for providing enhanced visualization of an eye 12. The system 10 may be implemented in a visualization module 14. Referring to FIG. 1, the system 10 includes a controller C having at least one processor P and at least one memory M (or non-transitory, tangible computer readable storage medium) on which instructions may be recorded for executing a method 100, shown in and described below with respect to FIG. 2. The memory M can store controller-executable instruction sets, and the processor P can execute the controller-executable instruction sets stored in the memory M.

Referring to FIG. 1, the visualization module 14 is adapted to generate an original image 16 of the eye 12. As described below, the system 10 (via execution of the method 100) enables visual enhancement of selected areas, referred to herein as a selected zone Z, without affecting or degrading contrast in the remainder of the original image 16. In other words, the system 10 enables amplification of intensity in the selected zone Z in a way which does not alter the other colors present in the original image 16. The visual enhancement is tunable to match the enhancement needs for a variety of clinical scenarios. The system 10 improves visualization of structural features and pathologies for retinal, corneal, cataract and other ophthalmic surgeries. The system 10 may be implemented as part of a diagnostic imaging system and/or an ophthalmic surgical system.

Referring to FIG. 1, the original image 16 is multidimensional and may be divided into a plurality of pixels 18. Referring to FIG. 1, the visualization module 14 may employ a photosensor 20, which is an electromagnetic sensor that captures light and converts it to an electrical signal. The electrical signal may be converted to digital data by an image processor 24 and/or the controller C. In one example, the photosensor 20 is a camera. Other examples of photosensors include, but are not limited to, complementary metal-oxide-semiconductor (CMOS) sensors or charge-coupled device (CCD) sensors.

The original image 16 may be a captured still image or a real-time image. "Real-time" as used herein generally refers to the updating of information at the same rate as data is received. More specifically, "real-time" means that the image data is acquired, processed, and transmitted from the photosensor at a high enough data rate and a low enough delay that when the data is displayed, objects move smoothly without user-noticeable judder or latency. Typically, this occurs when new images are acquired, processed, and transmitted at a rate of at least about 30 frames per second (fps) and displayed at about 60 fps and when the combined processing of the video signal has no more than about $1/30^{th}$ second of delay.

Referring to FIG. 1, the visualization module 14 may include a stereomicroscope 22 which directs a plurality of optical views of the eye 12 onto the photosensor 20. The controller C may be configured to process the output from the visualization module 14 for eventual broadcasting on a display 26. The output may be transmitted as a real-time high-resolution video signal for recording or presented for display and viewing. When the output from the visualization module 14 includes multiple views of the eye 12, the display 26 may be made three-dimensional such that depth of field is presented to the ophthalmic surgeon. The display 26 may include, but is not limited to, a high-definition television, an ultra-high-definition television, smart-eyewear, projectors, one or more computer screens, laptop computers, tablet computers and may include a touchscreen.

Examples of systems for digital microscopy that utilize a display 26 for visualization during ophthalmic surgery include Alcon Laboratories NGENUITY® 3D Visualization System (Alcon Inc., Fribourg, Switzerland), a module for Digitally Assisted Vitreoretinal Surgery (DAVS). The NGENUITY® 3D Visualization System includes a High Dynamic Range (HDR) camera that is a 3D stereoscopic, high-definition digital video camera configured to provide magnified stereoscopic images of objects during microsurgery. The HDR camera functions as an addition to the surgical microscope during surgery and is used to display original images or images from recordings.

Figure 3:
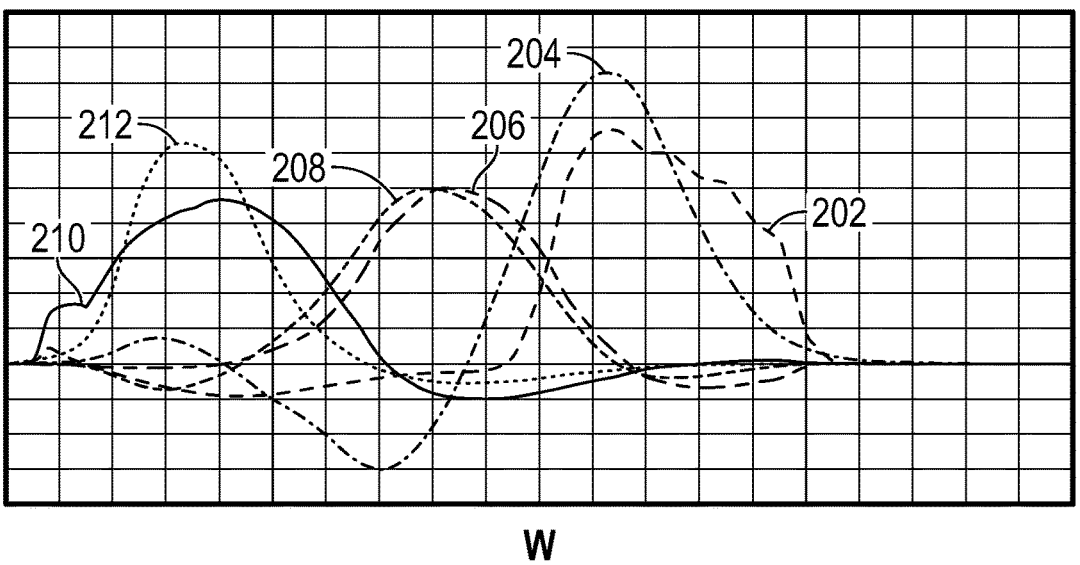
FIG. 3 is a schematic graph showing spectral sensitivity for a plurality of sensors in an example photosensor employable by the visualization module of FIG. 1, with wavelength on the horizontal axis.

Referring now to FIG. 3, a flow chart is shown of an example implementation or method 100 of the system 10. It is understood that the method 100 need not be applied in the specific order recited herein and some blocks may be omitted. The memory M can store controller-executable instruction sets, and the processor P can execute the controller-executable instruction sets stored in the memory M.

Figure 2:
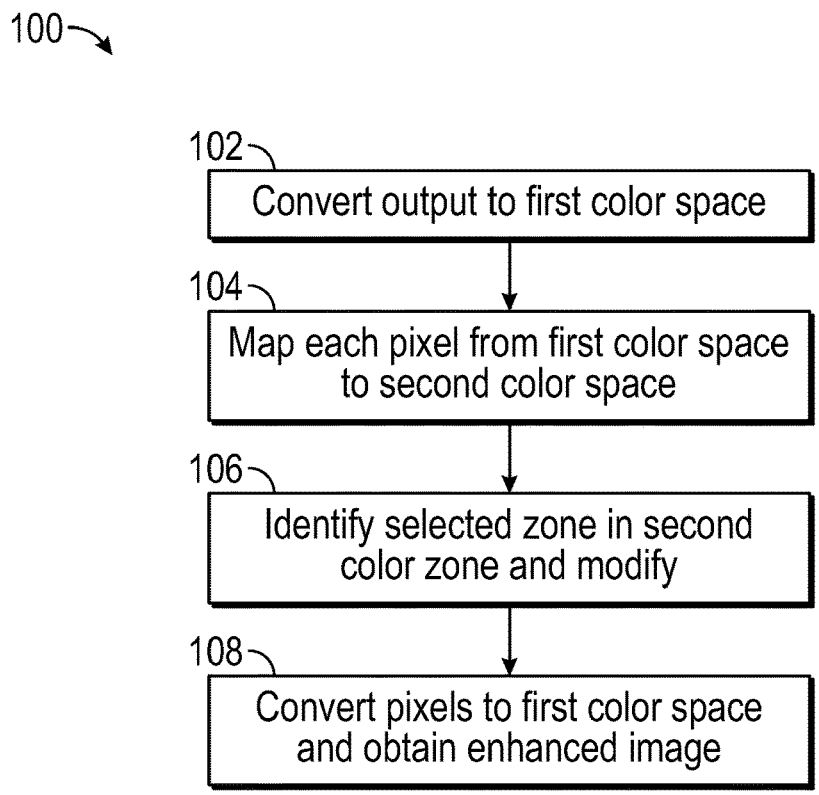
FIG. 2 is a flowchart of a method executable by the controller of FIG. 1.

Per block 102 of FIG. 2, the controller C is configured to convert the output of the visualization module 14 (e.g., the photosensor) to a first pixel cloud 30 in the first color space 32, shown in FIG. 1. The first color space 32 may be an RGB color space, which uses combinations of red (R), green (G), and blue (B) to produce a plurality of colors. Some RGB color spaces used for digital cameras include Standard RGB (sRGB) and Adobe RGB.

The output may be converted based on the spectral intensity and properties of a plurality of sensors 40 in the photosensor 20. The photosensor 20 of FIG. 1 includes a plurality of sensors 40 that are sensitive to different parts of the spectrum, for example, one sensor is particularly sensitive to the color blue, another sensor is particularly sensitive to the color green and another sensor is particularly sensitive to the color red. Referring to FIG. 3, a set of traces 200 are shown, with spectral intensity I on the vertical axis and wavelength W on the horizontal axis. Traces 208, 210 and 212 represent the spectral sensitivity graphs for the plurality of sensors 40 for red, green and blue colors, respectively. Traces 202, 204 and 206 in FIG. 3 represent the standard RGB spectral sensitivity profiles used to convert output from a generic camera into red, green and blue colors respectively. Because color conversion is based on the respective spectral properties (represented by traces 208, 210 and 212) of the plurality of sensors 40, the color conversion is more tractable and stable.

Per block 104 of FIG. 2, the controller C is configured to map or convert the first pixel cloud 30 in the first color space 32 to a second pixel cloud 34 in a second color space 36 (see FIG. 1). The first pixel cloud 30 is re-arranged into the second color space 36 (as a second pixel cloud 34) according to the individual colors (i.e. 3D coordinates) in the first color space 32. In one example, the second color space 36 is a CIELAB color space, referred to herein as Lab color space 300 and shown in FIG. 4. In other words, the second pixel cloud 34 is the respective pixels 50 in the original image 16 re-arranged according to their L, a, b values. Changing the color perception of the original image 16 is done quantitatively in the second color space 36.

Figure 4:
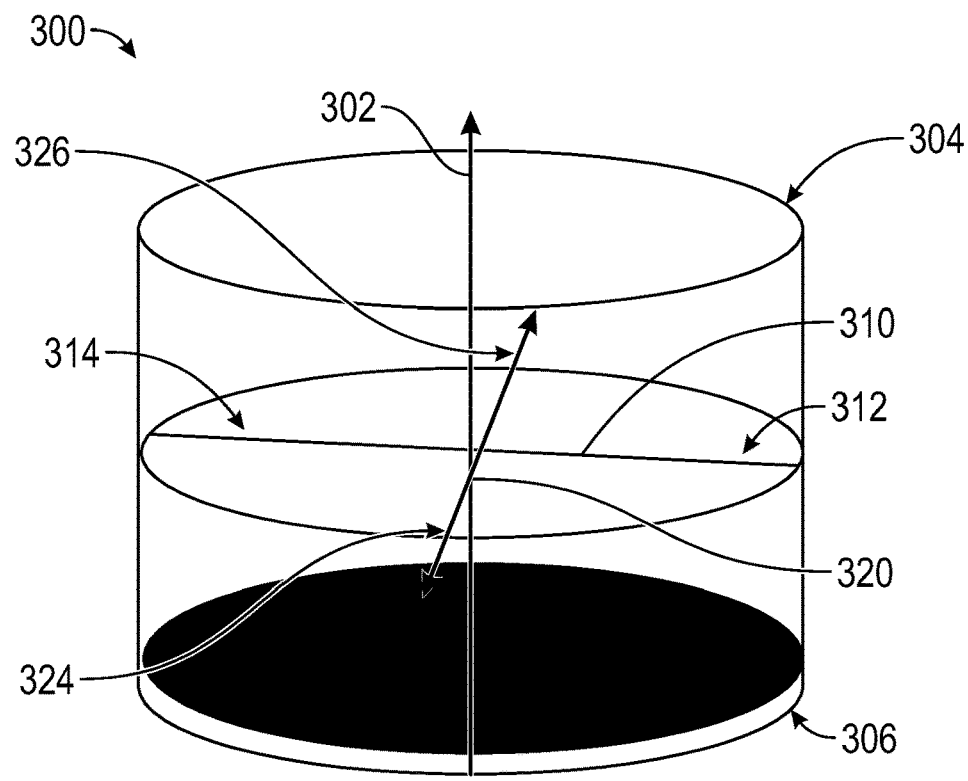
FIG. 4 is a schematic diagram illustrating an example of a second color space employable by the system of FIG. 1.

Referring to FIG. 4, the Lab color space 300 has a first axis 302 (L) representing a lightness factor, between a first end 304 (white) and a second end 306 (black). The Lab color space 300 has a second axis 310 (a) representing a green to red continuum, with green in a negative direction (at end 314) and red in a positive direction (at end 312). The Lab color space 300 has a third axis 320 (b) representing a blue to yellow continuum, with blue in a negative direction (at end 324) and yellow in a positive direction (at end 326). The second color space 36 may also be the CIE XYZ color space created by the International Commission on Illumination (CIE) in 1931.

Per block 106 of FIG. 2 and referring to FIG. 1, the controller C is configured to select or identify at least one selected zone Z ("at least one" omitted henceforth) in the second color space 36. The selected zone Z is a group of pixels or a subset of pixels that are selected based on their location or coordinates (L, a, b values) in the second color space 36 (e.g. Lab color space 300) and targeted for enhancement. The selection may be based on the individual L, a, b values, or a combination of values. For example, if a region of interest in the eye E has been exposed to a green dye, the selected zone Z would be the selected subset of pixels that are bright greenish pixels (e.g., using criteria such as L being greater than 10 and a being within a range from negative infinity to 35). For example, here the a value may increase according to the formula: $[(a-a_0)*\text{Gain factor}+a_0]$, where $a_0$ is the initial a value of the selected zone Z (such as 35 for example, as listed above). If a region of interest in the eye E has been exposed to a blue dye, the selected zone Z would be the subset of pixels that are bluish pixels. For example, here the b value may increase by a factor (gain).

Figure 5:
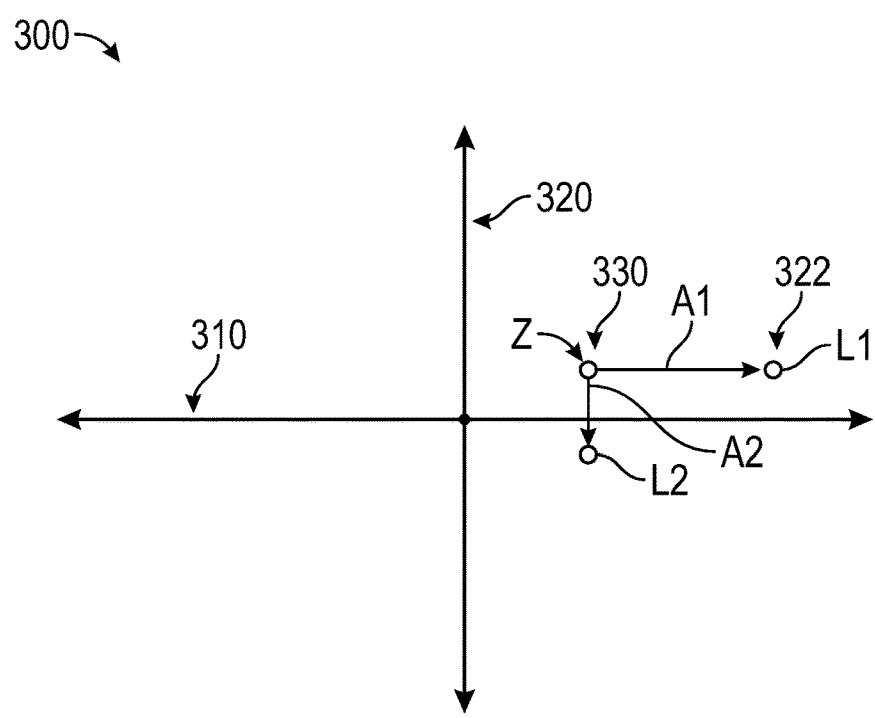
FIG. 5 is a schematic diagram illustrating a selected zone in second color space of FIG. 4.

Once selected, the location of the selected zone Z in the second color space 36 (e.g., Lab color space 300) is altered in order to intensify the color of the selected zone Z (by moving to a deeper shade in the second color space 36) or add contrast (by moving to a contrasting shade in the second color space 36). Referring now to FIG. 5, the selected zone Z is shown in the Lab color space 300 at an original location 330, in a two-dimensional view. As noted above, the Lab color space 300 has a second axis 310 (a) representing a green to red continuum, and a third axis 320 (b) representing a blue to yellow continuum. As shown by arrows A1 and A2 in FIGS. 4 and 5, the selected zone Z may be moved or translated along the second axis 310 (a) and/or third axis 320 (b) to a modified location L1 or a modified location L2, in order to intensify the color of the selected zone Z. The arrows A1 and A2 need not be parallel to the second axis 310 (a) and third axis 320 (b). Alternatively, the modified location L2 may be obtained by rotating the original location 330 along one of the second axis 310 (a) and third axis 320 (b). The modified location L2 may be a mirror image of the original location 330 relative to one of the respective axes in the second color space 36.

Block 106 further includes updating L, a, b values of the selected subset of pixels in the selected zone Z with the modified location to obtain a modified second pixel cloud 37 in the second color space 36 (see FIG. 1). Updates may be made to any of the L, a, or b values of the selected zone Z. The system 10 may employ parameterized formulas to alter the location of the selected zone Z.

Per block 108 of FIG. 2, the controller C is configured to convert the modified second pixel cloud 37 in the second color space 36 into a third pixel cloud 38 in the first color space 32. The third pixel cloud 38 is used to form an enhanced image of the eye 12. A few clinical scenarios applying the system 10 are described below, with reference to FIGS. 6-9. While the system 10 in each of the cases follows the general implementation described above, each example may have a specific rendition to match the enhancement needs for the corresponding clinical scenario.

Figure 6:
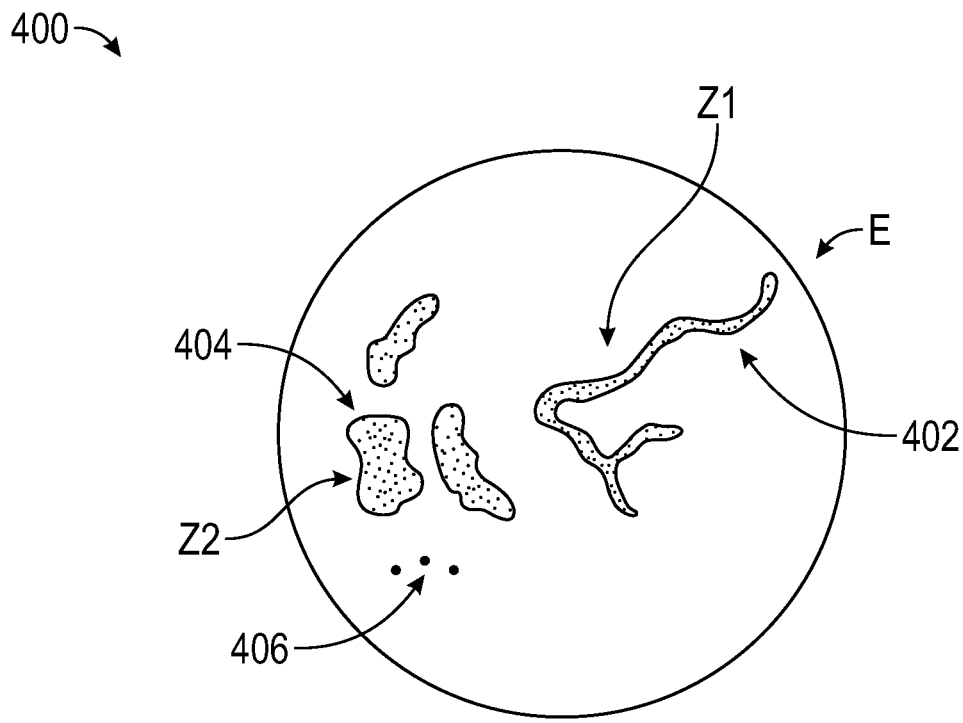
FIG. 6 is a schematic fragmentary diagram of an example enhanced image of an eye with the selected zone being one or more blood vessels.

A schematic illustration of an enhanced image 400 of an eye E is shown in FIG. 6. During vitro-retinal surgery, air may be injected into the eye E to remove intraocular fluid from the posterior segment of the eye 12. Intraocular pressure is maintained during this air-fluid exchange for various reasons, such as for example, temporarily holding the retina in place. During this air-fluid exchange, there is a loss of contrast in the blood vessels 402. By selecting the selected zone Z1 as the subset of pixels matching the reddish shade of one or more blood vessels 402 in the eye E, the red color of the blood vessels 402 is intensified, compensating for the loss of contrast during the air-fluid exchange.

In some embodiments, referring to FIG. 6, the selected zone Z2 (shaded in FIG. 6) corresponds to a region 404 of the eye E that is naturally relatively pale, including but not limited to, shades of white, ivory and cream. In other embodiments, the selected zone Z2 corresponds to particles 406 that are suspended into the eye E and become pale or white over time. The method 100 may be employed to digitally stain the selected zone Z2 with a predetermined color, thereby providing a "virtual" dye in the enhanced image 400. Thus, the enhanced image 400 provides selective intensification in the selected zone Z2, without affecting contrast in a remainder of the original image 16 (see FIG. 1).

The system 10 of FIG. 1 may be employed to provide targeted color enhancement in real-time, via a data structure 42 having a plurality of data repositories 44. Referring to FIG. 1, each data repository 44 has a first list 46 representing the original pixel color in the first color space 32 and a second list 48 representing the enhanced pixel color in the first color space 32. Each data repository 44 represents a respective pixel 50 of the plurality of pixels 18. The first list 46 may be a set of pixel color (original RGB triplets) sampled from an RGB 3D cube at evenly spaced grid points. The first list 46 may be used to index the original pixel color. The second list 48 is the set of updated or enhanced pixel RGB color (modified RGB triplets), populated after enhancement per block 106. The color enhancement for each of the plurality of pixels 18 may be pre-computed and encoded in the data structure 42. In other words, the enhanced pixel color may be respectively stored in the second list 48 of each data repository 44. The controller C may be adapted to use the data structure 42 to continuously update the original image 16 in real-time.

The system 10 of FIG. 1 may be employed to provide dye labeling intensification during an ophthalmic procedure. Various dyes, such as indocyanine green, Brilliant Blue dye or Trypan Blue dye, are used to enhance visualization during an ophthalmic procedure. For each dye that is being used, the controller C is configured to identify the location in the second color space 36 of that particular dye color and amplify the intensity in a way which does not alter the other colors present in the surgical scene.

Figure 7:
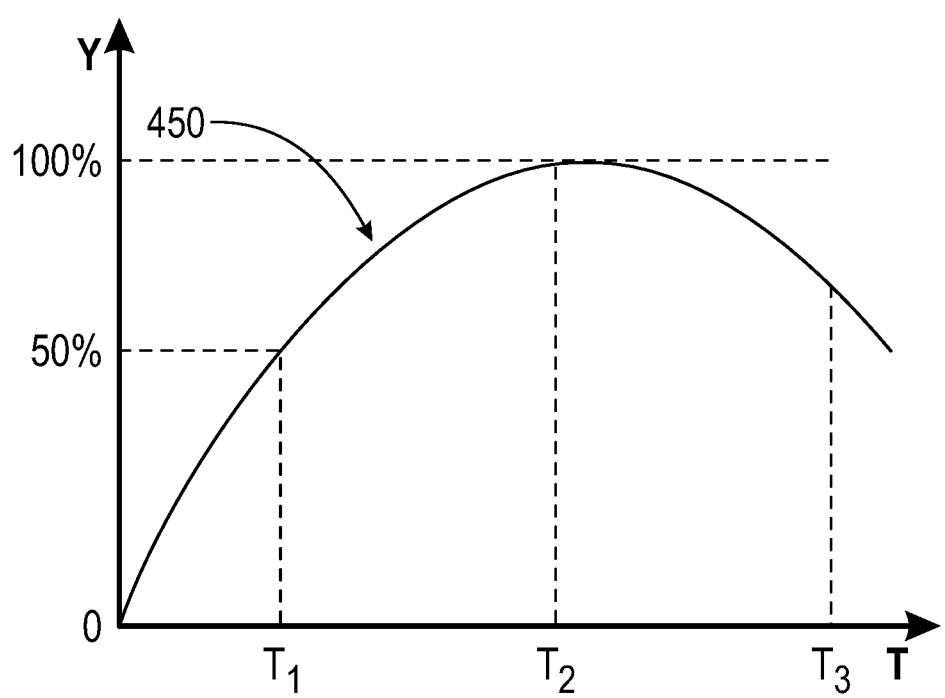
FIG. 7 is a schematic graph showing uptake of an example dye in a portion of the eye, with percent absorption of the dye on the vertical axis and time on the horizontal axis.

Additionally, the system 10 of FIG. 1 may be employed to minimize the use of dye and reduce waiting time for staining. Some dyes may bring unpleasant side effects or be toxic to certain cells. Thus, surgeons may not want to leave the dye in the eye any longer than necessary to get the desired effect on color and membrane stiffening. FIG. 7 shows an example trace 450 of dye concentration (in a region of the eye 12) for an example dye. The vertical axis Y shows percentage saturation of the dye and the horizontal axis shows exposure time t. The dye is partially absorbed at a first time T1, fully absorbed at a second time T2 (saturation time) and begins fading or losing concentration at a third time T3. In order to minimize exposure of the dye to the eye 12, the original image 16 at the first time T1 is enhanced (via execution of the method 100), without having to wait for the deeper color of the stain at the second time T2.

Furthermore, the system 10 may be employed to extend the useful duration of each dye injection/staining by enhancing a fading dye. For example, the original image 16 at the third time T3 may be enhanced to reflect the deeper stain originally occurring at the second time T2.

Figure 8:
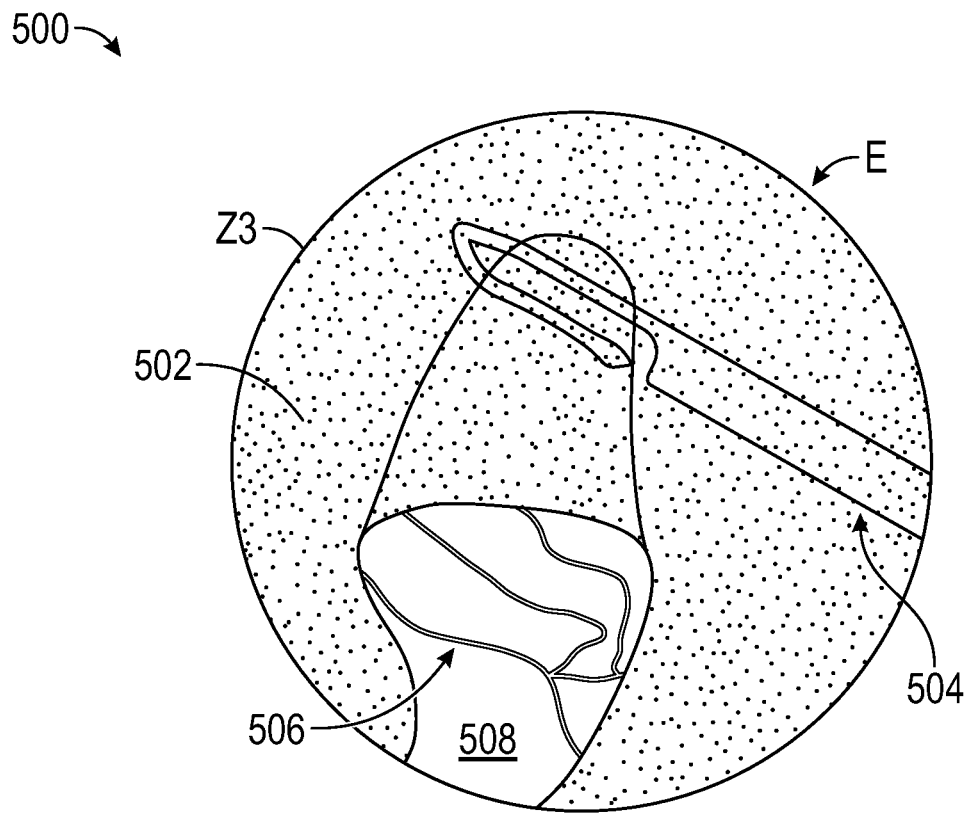
FIG. 8 is a schematic fragmentary diagram of another example enhanced image of an eye, with the selected zone being an epiretinal membrane.

Referring to FIG. 8, an enhanced image 500 of an eye E is shown. Here the selected zone Z3 (speckled in FIG. 8) corresponds to an epiretinal membrane 502 of the eye E. The epiretinal membrane 502 involves growth of a membrane similar to scar tissue. Because its growth may interfere with central vision, the epiretinal membrane 502 is often removed in vitro-retinal surgery. As part of the peeling procedure, the ophthalmic surgeon employs an instrument 504 (e.g. forceps) under high magnification, to grasp and gently peel away the epiretinal membrane 502. As the epiretinal membrane 502 is peeled away, blood vessels 506 become visible underneath, at the retinal surface 508. The epiretinal membrane 502 is stained with a dye (e.g. indocyanine green) to assist visualization during this delicate operation. The selected zone Z3 (per block 106 of FIG. 2) is selected to correspond to the stain of the dye, and selectively enhances visualization of the epiretinal membrane 502, without changing the color of other features.

Figure 9:
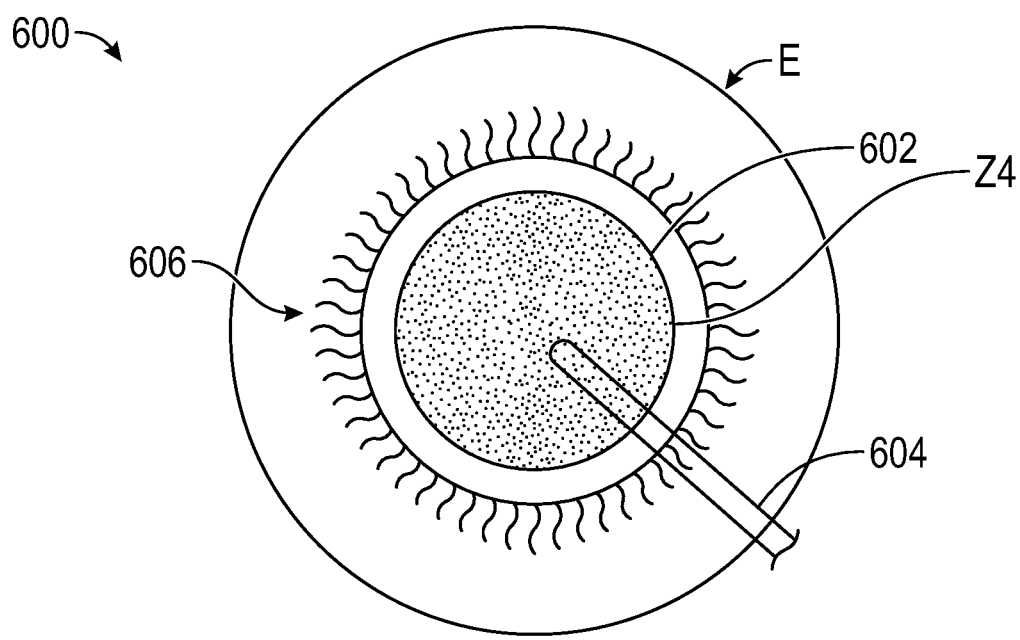
FIG. 9 is a schematic fragmentary diagram of another example enhanced image of an eye, with the selected zone being a capsular membrane of the lens.

The system 10 may be employed in cataract surgery, where the natural crystalline lens of the eye 12 is removed and replaced with an intraocular lens. FIG. 9 is a schematic illustration of an enhanced image 600, showing a capsular membrane 602 of an eye E, a surgical instrument 604 and blood vessels 606. During cataract surgery, a dye may be applied for selective uptake by the capsular membrane 602. The selected zone Z4 here is chosen to match the dye stain absorbed by the capsular membrane 602. Targeted color enhancement of the capsular membrane 602 may be implemented in real-time by employing the data structure 42. The system 10 may also be employed to intensify or enhance a "red reflex effect." In cataract surgery, surgeons sometimes rely on the "red reflex effect" where the patient's pupil is back illuminated to provide greater contrast to visualize the capsular membrane and lens of the eye. In other words, light passing through the pupil is reflected back off the retina to a viewing aperture, creating a reddish glow. Here the selected zone Z is selected to correspond to the reddish glow in order to selectively enhance it.

The exact parameters used to implement the enhancement may depend on the white balance setting in the original image, due to reasons such as patient eye pathology and the use of different illuminants by the surgeon, with different color temperature and color settings. In some embodiments, after transformation to the Lab space 300, pixel selection criteria is based on the L, a, b value and modification is made to the (a, b) components and/or L, i.e., only the (a, b) components or only the L component or both. For red reflex enhancement, a new brightness value (new L) may be obtained using R, G, and B combinations, according to a formula: R*weight+(G*0.8374+B*0.1626)*(1−weight), where weight may be between 0.2989 (no change) and 1.0 (maximal enhancement of red reflex).

For blood vessel enhancement, each pixel may be updated depending on its reddishness, by enhancing red, and attenuating green (e.g., if a>0, a=a*gain1; if a<0, a=a*gain2, here gain1 can be 2.0, and gain2 can be 0.5). For glare reduction, the pixel intensities for L may be reduced by a factor, using a formula, e.g., new L=L*factor, and factor=1−$a_0$*exp((L−100)/$a_1$). Example values may be: $a_0$=0.25, and $a_1$=25, with higher values of L having greater reduction. For white dye enhancement, a measurement called color distance may be defined, which describes how the chromaticity of pixel is different from a reference (white) point, as follows:

$$\text{color\_distance} = \sqrt{(x-0.3127)^2 + (y-0.3290)^2}.$$

Here x and y are normalized X and Y and the intensity of each pixel is varied based on its color distance to the white-point, using an example formula: factor=(1+$a_0$*exp(−(color_distance/$a_1$)$^2$)/(1+$a_0$). Here, for example, $a_0$=9, and $a_1$=0.1, with higher intensity reduction as the color distance of a pixel from white point becomes larger. The color distance may be calculated according to other reference chromaticity coordinates as well. Other formulas describing the intensity reduction variation according to color distance may be used.

For virtual dye, the color of each pixel may be determined as:

$$\text{color\_distance} = \sqrt{(x-x_{\text{white}})^2 + (y-y_{\text{white}})^2}.$$

Here x and y are the normalized X and Y values; and x_white and y_white are the predetermined white dye color (white). Where the virtual dye is blue (x_blue, y_blue), depending on its color distance to reference, the following example formulae may be used to obtain the new coordinates: new x=factor*x_blue+(1−factor)*x; and new y=factor*y_blue+(1−factor)*y. Here, factor=$a_0$*exp(−(color_distance/$a_1^2$), where $a_0$=0.25 and $a_1$=0.05.

The original image 16 of FIG. 1 may exhibit a first color cast which depends on the lighting conditions when the eye 12 was being imaged, i.e., the first color cast is induced by an input illuminant (e.g., D50). The characteristics of various illuminants are defined spectrally in the art. For example, illuminant series D represents natural daylight, with an adjacent number indicating the correlated color temperature (CCT) of the source, e.g., illuminant D50 has a CCT of 5000 K, and illuminant D65 has a CCT of 6500 K. Illuminant series F represents various types of fluorescent lighting, e.g., illuminant F2 represents cool white fluorescent, while illuminant F11 represents a narrow-band fluorescent. Optionally, the controller C may be adapted to employ a chromatic adaptation transformation (CAT) to change the first color cast to a second color cast induced by an output illuminant (e.g., D65) for the enhanced image. Any chromatic adaptation transformation (CAT) matrix available to those skilled in art may be employed to transform between various illuminants, including but not limited to, the Bradford, Bartleson and Sharp transformations.

The various components of the system 10 may be physically linked or configured to communicate via a network 52, shown in FIG. 1. The network 52 may be a bi-directional bus implemented in various ways, such as for example, a serial communication bus in the form of a local area network. The local area network may include, but is not limited to, a Controller Area Network (CAN), a Controller Area Network with Flexible Data Rate (CAN-FD), Ethernet, blue tooth, WIFI and other forms of data. The network 52 may be a Wireless Local Area Network (LAN) which links multiple devices using a wireless distribution method, a Wireless Metropolitan Area Networks (MAN) which connects several wireless LANs or a Wireless Wide Area Network (WAN) which covers large areas such as neighboring towns and cities.

The controller C of FIG. 1 may be an integral portion of, or a separate module operatively connected to the visualization module 14. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for enhancing visualization of an original image of an eye, the system comprising:
  a visualization module having a photosensor;
  a controller in communication with the visualization module and having a processor and tangible, non-transitory memory on which instructions are recorded;
  wherein execution of the instructions causes the controller to:
    convert an output of the visualization module to a first pixel cloud in a first color space, the first color space being an RGB color space;
    map the first pixel cloud to a second pixel cloud in a second color space;
    identify a single selected zone in the second pixel cloud in a portion of the eye for which visual enhancement is desired, the single selected zone being composed of pixels selected based on respective coordinates in the second pixel cloud;
    move the single selected zone from an original location to a modified location in the second color space;
    update the second pixel cloud in the second color space to obtain a modified second pixel cloud;
    transform the modified second pixel cloud in the second color space to a third pixel cloud in the first color space; and
    form an enhanced image of the eye based in part on the modified second pixel cloud, the enhanced image providing selective visual enhancement in the single selected zone;
  wherein the second color space is defined by a first axis with a lightness factor representing a white to black continuum, a second axis representing a green to red continuum and a third axis representing a blue to yellow continuum;
  wherein the controller is adapted to obtain a new lightness factor for the single selected zone in the second color space based in part on respective values of R, G, B in the first color space and a predefined weighting factor W chosen to enhance at least one component of the RGB color space, the controller being adapted to obtain the new lightness factor as: R*W+[(G*C1+B*C2)*(1−W)] for red reflex enhancement, where C1 and C2 are predefined constants having a respective value of less than 1.0; and wherein the weighting factor extends approximately between 0.30 and 1.0, the weighting factor being selected to be higher for increasing the red reflex enhancement.

2. The system of claim 1, wherein:
the controller is adapted to continuously update the original image in real-time via a data structure having a plurality of data repositories; and
each of the plurality of data repositories respectively has a first list representing an original pixel color in the first color space and a second list representing an enhanced pixel color in the first color space.

3. The system of claim 1, wherein:
the photosensor includes a plurality of sensors; and
converting the output from the visualization module is based in part on a respective spectral sensitivity of the plurality of sensors in the photosensor.

4. The system of claim 1, wherein:
the second color space includes a plurality of axes; and
the modified location is a translation of the original location along at least one of plurality of axes in the second color space.

5. The system of claim 1, wherein the modified location is a mirror image of the original location along a respective axis in the second color space.

6. The system of claim 1, wherein:
the controller is adapted to select the single selected zone to include one or more blood vessels in the eye, the original image of the eye being taken during an air-fluid exchange; and
the controller is adapted to enhance the original image to compensate for loss of contrast in the one or more blood vessels during the air-fluid exchange.

7. The system of claim 1, wherein:
the controller is adapted to select the single selected zone to include particles that are suspended in the eye, the enhanced image of the eye providing a virtual dye by digitally staining the particles with a predetermined color.

8. The system of claim 1, wherein:
the controller is adapted to select the single selected zone to include a region of the eye absorbing a dye via selective uptake; and
the enhanced image of the eye provides color intensification in the single selected zone.

9. The system of claim 8, wherein
the controller is adapted to enhance the original image of the eye at a first time when the dye is only partially absorbed.

10. The system of claim 9, wherein the original image is obtained during peeling of an epiretinal membrane in the eye.

11. The system of claim 10, wherein the dye is indocyanine green.

12. The system of claim 8, wherein:
the controller is adapted to enhance the original image of the eye at a third time when the dye begins fading, the dye being fully absorbed at a second time less than the third time.

13. The system of claim 8, wherein:
the dye is absorbed by a capsular membrane of the eye, the enhanced image providing enhanced visualization of the capsular membrane.

14. A system for enhancing visualization of an original image of an eye, the system comprising:
a visualization module having a photosensor;
a controller in communication with the visualization module and having a processor and tangible, non-transitory memory on which instructions are recorded;
wherein execution of the instructions causes the controller to:
convert an output of the visualization module to a first pixel cloud in a first color space, the first color space being an RGB color space;
map the first pixel cloud to a second pixel cloud in a second color space;
identify a single selected zone in the second pixel cloud such that the single selected zone includes particles that are suspended in the eye, the single selected zone being composed of pixels selected based on respective coordinates in the second pixel cloud in a portion of the eye for which visual enhancement is desired;
move the single selected zone from an original location to a modified location in the second color space;
update the second pixel cloud in the second color space to obtain a modified second pixel cloud;
transform the modified second pixel cloud in the second color space to a third pixel cloud in the first color space; and
form an enhanced image of the eye based in part on the modified second pixel cloud, the enhanced image providing selective visual enhancement in the single selected zone, the enhanced image of the eye providing a virtual dye by digitally staining the particles with a predetermined color;
wherein the second color space is defined by a first axis with a lightness factor representing a white to black continuum, a second axis representing a green to red continuum and a third axis representing a blue to yellow continuum;
wherein the controller is adapted to obtain a new lightness factor for the single selected zone in the second color space based in part on respective values of R, G, B in the first color space and a predefined weighting factor W chosen to enhance at least one component of the RGB color space; and
wherein the controller is adapted to obtain the new lightness factor as: R*W+[(G*C1+B*C2)*(1−W)] for red reflex enhancement, where C1 and C2 are predefined constants having a respective value of less than 1.0, the weighting factor extending between about 0.30 and 1.0, the weighting factor being selected to be higher for increasing the red reflex enhancement.

15. The system of claim 14, wherein:
the controller is adapted to continuously update the original image in real-time via a data structure having a plurality of data repositories; and
each of the plurality of data repositories respectively has a first list representing an original pixel color in the first color space and a second list representing an enhanced pixel color in the first color space.

16. The system of claim 14, wherein:
the second color space includes a plurality of axes; and
the modified location is a translation of the original location along at least one of plurality of axes in the second color space.

17. The system of claim 14, wherein the modified location is a mirror image of the original location along a respective axis in the second color space.

18. The system of claim 14, wherein the original image exhibits a first color cast induced by an input illuminant, the controller being adapted to apply a chromatic adaptation transformation to convert the first color cast to a second color cast such that an entirety of the enhanced image exhibits the second color cast.

\* \* \* \* \*